(12) United States Patent
Katz et al.

(10) Patent No.: US 9,110,850 B2
(45) Date of Patent: Aug. 18, 2015

(54) METHOD FOR ACCELERATING START UP OF A COMPUTERIZED SYSTEM

(75) Inventors: Igor Katz, Rosh HaAyin (IL); Oren Yekutieli, Modi'in (IL)

(73) Assignee: ECI Telecom Ltd., Petach-Tikva (IL)

( * ) Notice: Subject to any disclaimer, the term of this patent is extended or adjusted under 35 U.S.C. 154(b) by 788 days.

(21) Appl. No.: 13/243,781

(22) Filed: Sep. 23, 2011

(65) Prior Publication Data

US 2012/0089716 A1 Apr. 12, 2012

(30) Foreign Application Priority Data

Oct. 12, 2010 (IL) .......................................... 208641

(51) Int. Cl.
*G06F 11/00* (2006.01)
*G06F 11/14* (2006.01)
*H04L 12/24* (2006.01)

(52) U.S. Cl.
CPC ............. *G06F 11/1471* (2013.01); *H04L 12/24* (2013.01); *H04L 41/00* (2013.01)

(58) Field of Classification Search
CPC ...... G06F 11/1471; H04L 41/00; H04L 12/24
USPC .......................................................... 709/223
See application file for complete search history.

(56) References Cited

U.S. PATENT DOCUMENTS

| 4,905,196 | A | | 2/1990 | Kirrmann |
| 5,369,757 | A | * | 11/1994 | Spiro et al. ...................... 714/19 |
| 5,701,480 | A | * | 12/1997 | Raz ................................ 718/101 |
| 5,943,675 | A | * | 8/1999 | Keith et al. ............................ 1/1 |
| 6,032,158 | A | * | 2/2000 | Mukhopadhyay et al. ............ 1/1 |
| 7,236,987 | B1 | * | 6/2007 | Faulkner et al. ....................... 1/1 |
| 7,430,568 | B1 | * | 9/2008 | DeKoning et al. ..................... 1/1 |
| 7,792,885 | B2 | | 9/2010 | Piper et al. |
| 8,175,418 | B1 | * | 5/2012 | Keith, Jr. ........................ 382/305 |
| 8,621,165 | B1 | * | 12/2013 | Sridharan et al. ............. 711/162 |
| 2002/0059414 | A1 | * | 5/2002 | Katz et al. ...................... 709/223 |
| 2002/0116404 | A1 | * | 8/2002 | Cha et al. ....................... 707/202 |
| 2002/0194429 | A1 | * | 12/2002 | Chiu et al. ..................... 711/118 |
| 2003/0018878 | A1 | * | 1/2003 | Dorward et al. .............. 711/216 |
| 2003/0033327 | A1 | * | 2/2003 | Mandal et al. ................ 707/204 |
| 2003/0135478 | A1 | * | 7/2003 | Marshall et al. .................. 707/1 |

(Continued)

FOREIGN PATENT DOCUMENTS

| CN | 1214323 | C | * | 8/2005 |
| DE | 10112941 | B4 | * | 5/2009 |

(Continued)

*Primary Examiner* — Kostas Katsikis
(74) *Attorney, Agent, or Firm* — Novick, Kim & Lee, PLLC; Harold L. Novick; Jae Youn Kim

(57) ABSTRACT

Technique for reducing start-up time of a computerized system comprising a computer application with a data base DB and one or more functional blocks with respective memories; the system comprises a communication network being managed by the computer application. The technique comprises providing each of said functional blocks with basic information about the communication network; updating the functional blocks about changes whenever take place in the network; updating objects in the base DB by the updated functional blocks; creating an image of at least one functional block of the blocks in a persistent memory, building a changes log and to in case of failure of the mentioned functional block, promptly restoring thereof by using the image in the persistent memory and the changes log.

10 Claims, 1 Drawing Sheet

(56) References Cited

U.S. PATENT DOCUMENTS

| | | | |
|---|---|---|---|
| 2003/0200394 A1* | 10/2003 | Ashmore et al. | 711/119 |
| 2004/0031030 A1* | 2/2004 | Kidder et al. | 717/172 |
| 2004/0260726 A1* | 12/2004 | Hrle et al. | 707/104.1 |
| 2005/0278583 A1* | 12/2005 | Lennert et al. | 714/43 |
| 2006/0085418 A1 | 4/2006 | Piper et al. | |
| 2006/0218204 A1* | 9/2006 | Ofer et al. | 707/201 |
| 2006/0224636 A1* | 10/2006 | Kathuria et al. | 707/200 |
| 2006/0235909 A1* | 10/2006 | Oks et al. | 707/204 |
| 2007/0005664 A1* | 1/2007 | Kodavalla et al. | 707/202 |
| 2007/0112892 A1* | 5/2007 | Langley et al. | 707/204 |
| 2007/0174325 A1* | 7/2007 | Mooney et al. | 707/102 |
| 2007/0185923 A1* | 8/2007 | Nishikawa et al. | 707/202 |
| 2007/0276885 A1* | 11/2007 | Valiyaparambil et al. | 707/204 |
| 2008/0120349 A1* | 5/2008 | Kim et al. | 707/202 |
| 2009/0125568 A1* | 5/2009 | Nishikawa et al. | 707/202 |
| 2009/0327589 A1* | 12/2009 | Moshayedi | 711/103 |
| 2010/0169551 A1* | 7/2010 | Yano et al. | 711/103 |
| 2010/0205353 A1* | 8/2010 | Miyamoto et al. | 711/103 |
| 2010/0205391 A1* | 8/2010 | Miyamoto | 711/162 |
| 2011/0173380 A1* | 7/2011 | Yano et al. | 711/103 |
| 2011/0185106 A1* | 7/2011 | Yano et al. | 711/103 |
| 2011/0238899 A1* | 9/2011 | Yano et al. | 711/103 |
| 2012/0054540 A1* | 3/2012 | Howard et al. | 714/6.12 |

FOREIGN PATENT DOCUMENTS

| | | | | |
|---|---|---|---|---|
| JP | 09081464 A | * | 3/1997 | G06F 12/16 |
| JP | 2002163137 A | * | 6/2002 | G06F 12/00 |
| KR | 100450400 | * | 9/2004 | G06F 17/40 |

\* cited by examiner

METHOD FOR ACCELERATING START UP OF A COMPUTERIZED SYSTEM

FIELD OF THE INVENTION

The present invention relates to the field of operating computerized systems, especially—distributed systems which comprise computer programs responsible for treatment/monitoring/controlling of some underlying network elements. In one implementation, the invention may relate to management systems for telecommunication networks.

BACKGROUND OF THE INVENTION

The topic of monitoring and/or controlling of real objects in real time by computerized systems is quite well known, and problems related to such applications have been studied at least during the recent decade.

Some known solutions are as follows:

U.S. Pat. No. 4,905,196β In order to reduce the down time of a computer caused by a fault or interrupt in the program run, program recovery points are provided which are time-dependent or can be preset in the main program of a useful program, and when these recovery points are reached, the computer status is stored in at least one fault-tolerant archival memory. The computer status includes the status of the variables of a useful program being executed, the register status of the processor and the register status of the input/output devices of the computer. During execution of the useful program, at least a part of the current computer status is stored in a main memory and copied into an archival memory when a program recovery point is reached. By using a small, fast cache memory between the processor and the main memory, the write cycles in the archival memories may be reduced since a variable is replaced in the main memory only when it is displaced from the cache memory by a variable which may have been updated several times. A further improvement is achieved by using an associative stack on the bus) as the main and the two archival memories. All modifications in the main memory) are simultaneously entered into the stack and into an archival memory without involving the processor. In the stack, address data pairs are entered in the order of occurrence, a character recording the respective state of the stack and allocating locations to new address/data pairs. At the recovery point, only updated data need to be transferred into the archival memory. The main memory can be integrated into an archival memory having a read/write memory area and a fault-tolerant tributary memory area. A cascaded memory or a virtual memory of the computer can also be used for saving the computer status.

US2006085418β describes a system and method for providing a shared RAM cache of a database, accessible by multiple processes. By sharing a single cache rather than local copies of the database, memory is saved and synchronization of data accessed by different processes is assured. Synchronization between the database and the shared cache is assured by using a unidirectional notification mechanism between the database and the shared cache. Client APIs within the processes search the data within the shared cache directly, rather than by making a request to a database server. Therefore server load is not affected by the number of requesting applications and data fetch time is not affected by Inter-Process Communication delay or by additional context switching. A new synchronization scheme allows multiple processes to be used in building and maintaining the cache, thus reducing the start up time.

To the best of the Applicant's knowledge, there is no suitable and effective techniques for shortening start-up time of a computerized system that performs monitoring/control of a real (i.e., large and complex) communication network. Still, there is a long felt need in such a technique.

SUMMARY OF THE INVENTION

The Inventors propose a new technique for reducing start up time of a computer application, such as a computerized control and/or management system—for example a network management system (NMS).

A method for reducing start-up time of a computerized system including a computer application (for example, such as a Network Management System NMS) comprising its data base DB and one or more functional blocks (such as executable software processes) with respective memories and also including a communication network interacting with and being controlled/managed by the computer application, the method comprising:
  providing each of said functional blocks with basic information about the communication network, required for performing functions of said functional block, —updating each of said functional blocks (for example by collecting and processing notifications issued from said communication network) about changes whenever take place in the network;
  updating objects (records) in said data base DB by the updated functional blocks; the method further comprises performing the following operations:
  periodically (or from time to time) creating an image of at least one functional block of said blocks in a persistent memory, by mapping at least the memory of said at least one functional block in said persistent memory;
  building a changes log by immediately logging to it updates of the updated objects of the data base DB; and
  in case of failure of said at least one functional block, promptly restoring thereof by using said image in the persistent memory and said changes log, thereby safely maintaining control/management of the communication network.

It should be explained that the memory of each specific functional block is intended for in-memory data storage where its data is a part of the information stored in the application's disk storage (such as database DB of the NMS). The data is initially loaded from that storage, while is suitably transformed to become part of the specific functional block. It should be kept in mind that loading and transforming of the information when loading to the functional block(s) usually takes quite a lot of time, and the proposed invention is going to solve such a problem in cases when one or more of the functional blocks fail, or the whole application has to be restarted for any reason—and therefore require reloading of the suitable data.

For example, the functional blocks with their in-memory data are responsible for respective physical/technological processes for control and/or management of an under-laying communication network comprising network elements.

The step of providing each of said functional blocks with basic information may comprise an operation of loading topological data about the network to the functional blocks and, there-from, to the data base DB of the computerized application.

In case of restarting the application due to crash of one of its functional blocks, the method may comprise loading, to the memory of the failed functional block, said image of the failed functional block, and correcting the loaded image using changes stored in said changes log, including changes induced by other functional blocks if remain alive during the crash.

Updating the functional blocks comprises updating of their memory and may comprise one or more of the following: collecting and processing the notifications, exchanging information concerning the changes, such as the processed notifications, between the functional blocks. Exchange of the information may allow updating of the functional blocks not only about direct changes in the networks but also about some relations/updates which have been altered due to the changes. However, update of the functional blocks may be caused by other reasons/orders, for example by the computerized application itself (say, by orders within NMS or from an operator). As has been mentioned, updates of the functional blocks are quite immediately reflected in the data base DB.

The mentioned image should be created in some persistent memory block which does not drop data when detached from a power source, and may be created by mapping or serializing data of said at least one functional block from time to time, and by building a backup (a backup file or a memory dump/section) using the serialized representation of the data, thus obtaining the mentioned image;

providing said image with time indication of last update of the memory of the functional block.

When speaking about serializing data of the functional block, we mean at least serializing the data from memory of the functional block.

The operation of building the changes log comprises providing each entry to the log with a timestamp (say, in the form of indication of time or in the form of counter of updates) and identification of the relevant objects (i.e., of the DB records) which is/are affected by the specific entry concerning the change.

When re-loading the memory of the functional block, all such objects should be identified using the log, and the functional block's memory should be then updated using the identified objects, up to the latest update of the data base.

In case of an expected or unexpected shutdown of a specific functional block in the system (i.e., said at least one functional block which has been provided with backup according to the proposed invention), the method further comprises:

restoring said specific functional block by using said image having the latest timestamp (time indication/counter of updates, in the preferred case, since the last serialization) and by updating said image by utilizing objects of the DB which IDs are registered in the changes log since the time indicated as the latest time indication of said image.

It is understood to those skilled in the art that, during a normal course of operation, the computer application is being dynamically updated due to dynamic processes taking place in the under-laying communication network. Actually, the authors propose periodically serializing memory of the functional blocks while registering the dynamic changes/updates in the changes log in a systematic manner, with indication of time and relevant objects in the DB, to allow using these updates for accelerating restart of the computerized application.

In other words, to achieve decreasing the computerized application's start-up time upon failure of the application, when re-staring the application, the method may comprise the following practical steps:

1. Loading so-called main required data (say, all topological data about the network) to the memory of functional blocks from a regular data base DB of the computerized application); the data may be transformed while loading;

Dynamically managing changes of the main data by updating the functional blocks and then saving the updates in the changes log (a block of persistence memory), with a "timestamp"/index of each change. The log of changes can be fed/maintained by more than one functional blocks (i.e., software supported processes, executable processes) in the system, or other components of the system (such as NMSTM, NMSTO, NMSEvMS) NMSEvMS—is a process that serves as the interface to notifications received from EMSs (Element Management systems), being responsible for writing the network changes to the DB. NMSTM/NMSTO—examples of processes that write, for example, so-called top down changes to the DB (i.e., changes that are triggered by the operator).

2. Dynamically managing changes of the main data by updating the functional blocks, the DB and then saving the updates in the changes log (say, a block of persistence memory), with a "timestamp"/index of each change. The log of changes can be fed/maintained by participation of more than one functional blocks (i.e., software supported processes, executable processes such as TM, TO, EvMS), or other components of the system.

3. When saving some changes in the memory of functional blocks (in the course of the above-mentioned managing and updating), performing the following operations by the functional blocks:

Registering these changes in the regular DB of the application by updating suitable objects (records) in the DB;

Saving identification of the changed objects/records, with their suitable timestamps, in the changes log;

sending updates from a specific functional block to other functional block(s) if appropriate.

4. Periodically mapping/serializing the main data (located at least in the memory of the functional block) with a current "timestamp"/index to create the image of the functional block in the mentioned backup file or in another persistent memory device (file or DB, disc, etc.);

5. Reloading the stored image (i.e., the last serialized data) in case of the application's (NMS) or the functional block's crash, when restart is required;

6. Updating the reloaded data by the logged changes, beginning from the latest "timestamp"/index of the serialized/stored image and updating it with all relevant changes available in the changes log, beginning from the timestamp of the last serialization up to the latest timestamp of the changes. These updates may be stored in the changes log by participation of other functional blocks as well as by components/processes of the system, which remain alive during the crash.

The inventive concept covers the above-described method, its various versions, a computerized application capable of implementing the inventive method, a combined system comprising the computerized system and a communication network controlled and maintained by the computerized system, and a suitable software product.

Namely, the proposed computerized application comprises a data base DB and one or more functional blocks (such as executable software processes or the like with respective memories) responsible for control or management of an under-laying communication network composed from network elements, the computerized application being designed so that:

each of said functional blocks is adapted to be preliminarily provided with main information about the communication network, for performing functions of said block, each of said functional blocks being updatable about changes whenever take place in the network;

the DB being adapted to reflect updates of said functional blocks;

the computerized application further comprising an additional persistent memory and a changes log, for fast re-start—for example in case of failure of at least one functional block; and the computerized application being adapted for periodically creating image of at least one of said functional blocks in said persistent memory;

immediately updating said change log about updates taking place in the DB (for example, updates resulted from processing said notifications in said respective functional blocks, exchange of information between the blocks, and/or other events such as commands), the computerized application being also adapted, in case of failure of said at least one functional block or restart of the application, to allow fast restoration of the functional block by using said image and said changes log, thus rendering fast re-start of the computerized application.

The proposed system may comprise the above-described application (preferably NMS) and an underlying communication network which is being controlled/managed by the application (NMS).

A software product proposed by the Inventors comprises computer implementable instructions and/or data for carrying out operations according to the above-described method, stored on an appropriate computer readable storage medium so that the software is capable of enabling operations of said method when used on a computer (processor). The software product is accommodated in the computerized application, in a specific example—in NMS.

BRIEF DESCRIPTION OF THE DRAWINGS

The above invention will be further described and illustrated with reference to the following non-limiting drawings, in which FIG. 1 schematically illustrates a computerized system (for example, NMS) being part of the newly proposed technique.

DETAILED DESCRIPTION OF PREFERRED EMBODIMENTS

Figure 1:
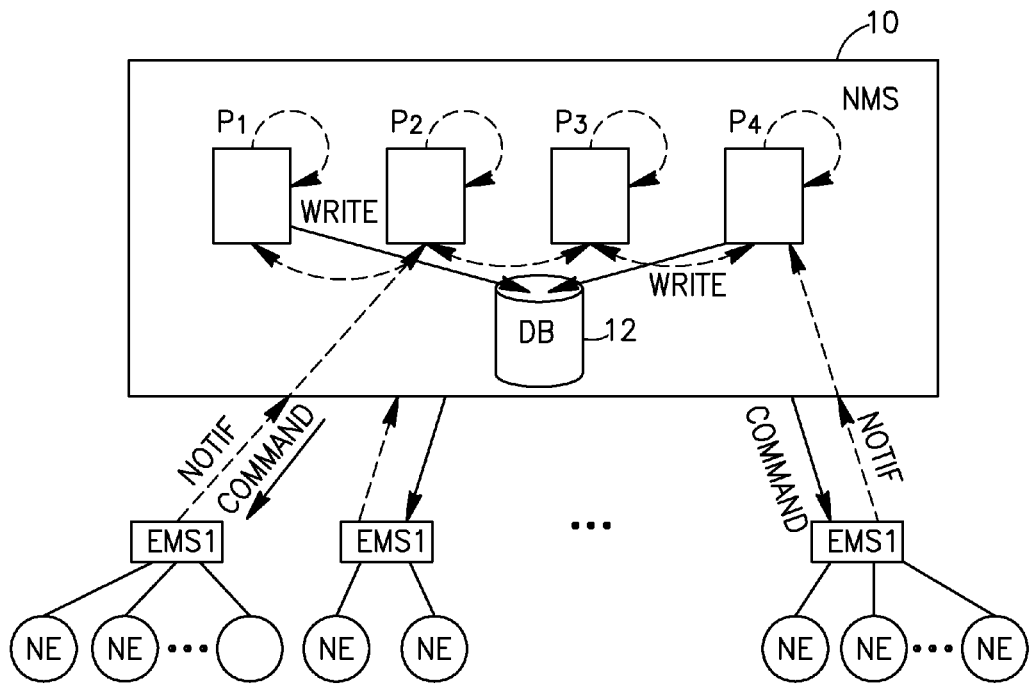

FIG. 1 shows an example where a network management system NMS 10, comprising a Data Base 12 and a number of functional blocks shown as software processes/programs (four of them P1-P4 are shown), interacts with a number of Element Management Systems (EMS1-EMS100 are shown). Each of the EMSs governs one or more network elements NEs of an under-laying communication network (not shown). Let all the processes P1-P4 run independently from one another and interact with the Data Base DB 12. Note that each EMS receives from the NMS commands (downstream arrows between NMS and EMS, such as commands "set", "get", etc), and sends to the NMS all required information about EMSs and the whole network of NEs, and also sends notifications about changes in its under-laying network of NEs. The notifications arrive to the NMS and are directed to one or more respective processes P1-P4, and each of the P1-P4 may forward a specific notification to a suitable another process, thereby selectively exchanging notifications there-between. Notifications are shown by dashed arrows in FIG. 1. From time to time, processes write down their internal updates to the DB 12 (see solid arrows towards the DB shown in FIG. 1).

All required information collected from the EMS-s is sufficient to form an image of topology of the network (sometimes not only of topology, for example—of states of the network elements NEs), and is stored in the data base DB 12. In case of any failure in the NMS or one or more of its processes P1-PN, followed by restarting the failed process or the whole system,—upload of the information from DB 12 will take quite a lot of time. It should be noted that data stored in and utilized by any one of the processes P1-P4 cannot be recovered when the process is crashed—in other words, the memory of the software process is normally not persistent and drops data when the software application is shutdown. It should be noted, that the process(es) may update themselves (see dashed arrows closed to their own blocks Pi).

Prior art references recognize that changes in a network which are reported by notifications should be stored as well, but such a process may be performed in many different ways, and not all are effective.

The Inventors propose an effective new method. The process/technique for performing the above task is schematically illustrated in FIG. 2.

Figure 2:
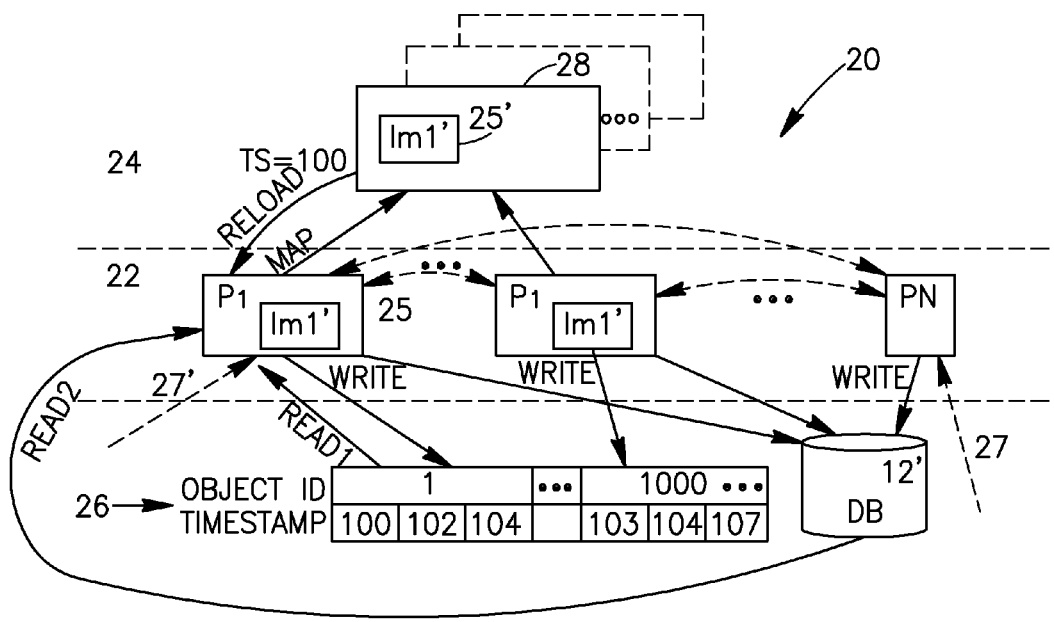
FIG. 2 schematically illustrates the system proposed by the inventors, capable of urgently self-recovering in case of failure of one or more elements thereof.

FIG. 2 schematically illustrates a sub-system 20 proposed by the Inventors, which comprises a so-called regular mode plane 22 and a so-called backup memory 24. Actually, the sub-system 20 comprises the discussed computer application such as a Network Management System NMS, and the complete proposed computerized system also includes a communication network (not shown but comprising network elements NEs and their management systems EMSs similar to those shown in FIG. 1).

The regular mode plane 22 comprises at least one first (main) functional block, for example the software process P1 described above in FIG. 1. The process communicates with the above-mentioned network (N) by obtaining notifications about changes there-from. Upon processing the notifications inside the functional blocks, and upon processing their own changes/updates, the processed changes may be written down in a changes log 26, wherein each such entry in the log 26 should be accompanied with an indication of time/time counter/timestamp and an indication (ID) of the relevant object in the DB. The Inventors propose that the log 26 be a part of the data base 12', but log 26 may be a separate memory unit.

The application object/process/block P1 is initially fed by so-called main data of the network (data about network elements and connections there-between which forms a so-called "image of the network" 25 in the application P1. For the first time, the main data (say, on topology) is provided to P1 directly from EMSses or preferably, via the data base DB; connections/rules are created in each of the Pi for its own purposes.

(As we remember, in the prior art data base DB served as backup for information used by the software processes. In case of any crash in the system, recovery of information from the DB was usually very slow).

In our proposed case, when the processes/applications (P1-PN in this example) and the whole NMS work without problems, notifications 27 about changes in the network will reach the relevant processes P1-PN and then, upon processing in the P1-PN, will be posted in DB and there-from—the changes log 26. Each entry in the log 26 will be provided with a timestamp and indication (ID) of the relevant object in the DB. This will allow, if recovery becomes necessary, reading from the DB only the objects which have been changed according to the information posted in the log 26. It should be noted that the processes (functional blocks P1-PN) should be updatable also by exchange of information there-between and by commands of the NMS and/or of the operator. DB of the application should also be updated about such changes in the P1-PN.

The second plane 24—a so-called backup memory—comprises a persistent (temporary or constant) memory 28 for providing quick backup to one or more application objects/processes of the NMS.

All information from at least one (and preferably, each) specific block/process P1 is stored from time to time (say, periodically mapped) to the persistent shared memory 28 (log, file) which cannot be erased when the process P1 is shutdown. Preferably, the information is stored in the serialized form, and the information—each time when being stored—is accompanied with a suitable timestamp (indication of the time of storing/save, or just a number of the change in the relevant counter) for the process Pi.

The memory 28 accommodates so-called reflection 25' which is something like a mirrored image 25' of the first process P1; actually, it may be a second process P1-2 being a copy of the application P1 stored in the persistent shared memory 28. The reflected/mirrored image 25' in 28 is preferably formed by periodically serializing and storing image 25 in the memory 28. The data is just streamed to be stored in the P1-2. In 28, the whole process P1 or at least its memory is stored.

The process of "mirroring" may be performed, for example, according to a previous Applicant's invention (US2002059414 AA or EA004193 B1, EP1213651 B1), which documents are incorporated herein by reference.

Since the reflected information is transferred and preferably stored in a serialized form, it can be restored from the persistent memory 28 quite fast,—in any case, much faster than from the DB 12.

The changes which continue taking place in the network, and due to that (but not only due to that) also in the functional blocks P1-PN between such "serialization and storing actions", are to be preserved in the above-mentioned persistent log 26 of changes. Changes in the network are notified to the blocks P1-PN by network notifications 27 (27' . . . , dashed arrows), and processed therein. The blocks may exchange information about various changes there-between (dashed arrows between the blocks). The updates/changes are entered by the blocks P1-PN into the DB 12', from the DB—into the log 26, and each change is provided with its ID (indicating the object in the DB in which the change is reflected), and with its unique timestamp indicating time or serial number of the change.

It should be mentioned, that the discussed changes of the P1-PN are either periodically (or quite immediately) entered into the regular DB (12') of the computer application.

Owing to that, if a system crash happens between two updates of the Data Base 12 and even between two adjacent "serialization moments" performed for a specific application object/software process P1-PN, the persistence log of changes will be capable to store the latest changes available for any of the processes. When the serialized data about a specific process Pi (having the latest timestamp, i.e., the latest stored version) is to be recovered from the serialized image, the Inventors suggest updating it with the last changes indicated in the persistence log 26 and having timestamps later than the latest timestamp of the relevant serialization/storage. Thus all available (stored) changes will be taken into account for maximally full restoration of the status of a specific software process, the NMS and finally, of the network status in the NMS.

If one of the processes fails, receipt of notifications to the log 26 from the underlying network may still be continued (since other processes will store any changes to the DB and the log), so that record of changes in the network will still be performed.

We consider that the log L (26) is part of the backup memory. In the drawing, log 26 is shown a part of the Data Base 12, but it may be a separate persistent memory for registering network/elements/process changes. The log always collects data from the network and stores any changes in its memory. The log is intended for updating the main data in the processes, but when, say the application process P1 is shut down for any reason, or when changes were not processed before P1 failed, or when they were not saved to the image, the stored/reflected or "mirrored" copy of the information in the 28 is re-loaded to the process P1 upon its restart, and thereupon the log L is being used to find out which changes had occurred from the time of the last saved image, in order to reload these changes from the DB.

It should be noted that when Application P1 is shut down, the log 26 should still be capable of receiving and storing changes. The log will still be able to work and can always be recovered from the memory of DB when trying to restart the NMS. Even if a number of processes/functional blocks of the computer application (say, such as NMS) fail, the proposed invention allows collecting (in the changes log) of information about notifications relevant to the failed blocks. Since the blocks exchange data about notifications there-between, the DB will be at least partially updated about the failed blocks. The process of handling change notifications is shown in FIG. 2 by dashed arrows, and the process of updating DB and the changes log 26 is shown by solid arrows (write). Stages of updating the functional block P1 are shown by the arrow READ1 (reading changes IDs from the changes log 26), and by the arrow READ2 (reading actual changes from identified objects in the data base 12').

It should be understood that other embodiments and versions of the described technique can be proposed and that such modifications should be considered part of the invention as far as being covered by the claims which follow.

The invention claimed is:

1. A method for reducing start-up time of a computerized system associated with a communication network interacting with and being managed by a computer application, the method comprising:
   providing information to a plurality of functional blocks being executable processes associated with the computer application, wherein the information is associated with a topology of and is configured to enable the plurality of functional blocks to perform functions;
   providing updates to the plurality of functional blocks regarding changes associated with at least one network element in the communication network after the changes have taken place;
   storing, in at least one persistent memory associated with the plurality of functional blocks, an image associated with a current topology of the communication network;
   updating a changes-log stored in a main memory associated with the computer application; and
   in case of failure of a functional block, the method further including updating the image stored in the at least one persistent memory associated with the failed functional block with changes stored in the changes-log, including one or more changes induced by other functional blocks that remained alive during the failure, wherein the one or more changes have timestamps associated with a time later than a time of the failure.

2. The method according to claim 1, further comprising creating the image by using serialization of data of the at least one functional block, building a backup using the serialized representation of the data, and providing the image with an indication of time or of a number of change indicating last update of the at least one functional block.

3. The method according to claim 1, wherein the step of updating the changes-log comprises one or more of the following: collecting notifications issued from said communication network, and exchanging of information concerning the changes between the plurality of functional blocks.

4. The method according to claim 1, wherein updating the changes-log comprises providing each entry in the changes-log with a timestamp being an indication of time or a number of changes counter, and an indication of objects relevant to the changes.

5. The method according to claim 1, further comprising:
 restoring of the failed functional block by reloading to it a suitable image having a latest timestamp and by updating the failed functional block by utilizing relevant entries registered in the changes-log as of the time indicated as the timestamp of the suitable image.

6. The method according to claim 1, wherein the computer application is a Network Management System (NMS) of the communication network.

7. The method according to claim 1, wherein the plurality of functional blocks are responsible for respective technological processes for control of an under-laying communication network comprising network elements.

8. The method according to claim 1, further comprising a preliminary operation of loading to the persistent memory of each specific functional block part of information stored in the computer application's database, while suitably transforming the information being loaded.

9. A software product stored on a non-transitory computer readable storage medium, which, when loaded and executed by a computer system associated with a communication network, causes at least one processor to:
 provide information to a plurality of functional blocks being executable processes associated with a computerized application, wherein the information is associated with a topology of the communication network and enable the plurality of functional blocks to perform functions;
 provide updates to the plurality of functional blocks regarding changes associated with at least one network element in the communication network after the changes take place;
 store, in at least one persistent memory associated with the plurality of functional blocks, an image associated with a current topology of the communication network;
 update a changes-log stored in a main memory associated with the computerized application; and
 in case of failure of a functional block, the at least one processor is further configured to update the image stored in the at least one persistent memory associated with the failed functional block with changes stored in the changes-log, including one or more changes induced by other functional blocks that remained alive during the failure, wherein the one or more changes have timestamps associated with a time later than a time of the failure.

10. A Network Management System (NMS) of a communication network associated with at least one network element, the NMS comprising:
 a main memory; and
 a processor in communication with the main memory, wherein the processor is configured to:
 provide information to a plurality of functional blocks being executable processes associated with the NMS, wherein the information is associated with a topology of the communication network and enable the plurality of functional blocks to perform functions;
 provide updates to the plurality of functional blocks regarding changes associated with at least one network element in the communication network after the changes take place;
 store, in at least one persistent memory associated with the plurality of functional blocks, an image associated with a current topology of the communication network;
 update a changes-log stored in the main memory; and
 in case of failure of a functional block, the processor is further configured to update the image stored in the at least one persistent memory associated with the failed functional block with changes stored in the changes-log, including one or more changes induced by other functional blocks that remained alive during the failure, wherein the one or more changes have timestamps associated with a time later than a time of the failure.

* * * * *